Nov. 18, 1958 J. E. CALLENDER 2,861,129

AUTOMATIC TELEPHONE SYSTEM

Filed Feb. 9, 1956 3 Sheets-Sheet 1

INVENTOR.
JACK E. CALLENDER
BY Brown, Jackson, Boettcher & Dienner
ATTYS.

INVENTOR.
JACK E. CALLENDER
BY Brown, Jackson, Boettcher & Dienner
ATTYS.

Nov. 18, 1958 J. E. CALLENDER 2,861,129

AUTOMATIC TELEPHONE SYSTEM

Filed Feb. 9, 1956 3 Sheets-Sheet 3

INVENTOR.
JACK E. CALLENDER

BY Brown, Jackson, Boettcher & Dienner

ATTYS.

2,861,129

AUTOMATIC TELEPHONE SYSTEM

Jack E. Callender, Galion, Ohio, assignor to North Electric Company, Galion, Ohio, a corporation of Ohio Application February 9, 1956, Serial No. 564,489

4 Claims. (Cl. 179—18)

Figure 1:
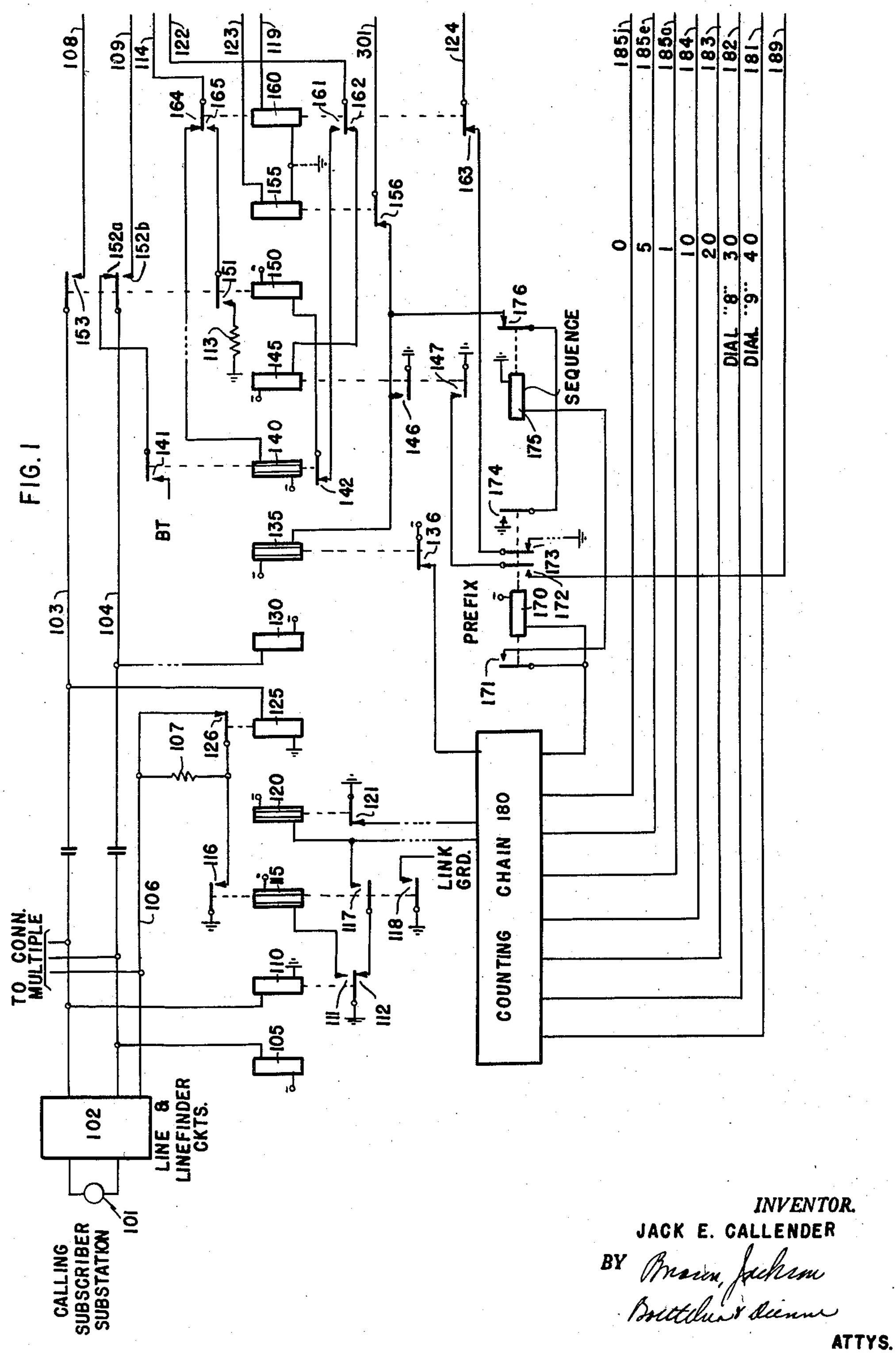

This invention relates to automatic telephone systems and more particularly to such systems including a novel and useful means for preventing the seizure of single digit trunks whenever the line number of a particular single digit trunk is dialed. It is known in the art to prevent the seizure of single digit trunks when line numbers are dialed by "busying out" the trunks; this is effected by disconnecting the leads from the connector to the trunk P-wires (test wires) and placing ground on the connector stubs, except when an authorized call is established by dialing an appropriate single digit. An obvious disadvantage of the conventional system is that the ground connection is extended to the connected P-wire multiples, therefore likewise preventing seizure of the adjacent multiples.

It is an object of this invention to provide means for preventing the seizure of single digit trunks when the line numbers of those trunks are dialed without altering or affecting the P-wire multiples in the connector links. As will be apparent to those skilled in the art, this is especially advantageous when bare wire multiples are used.

Figure 2:
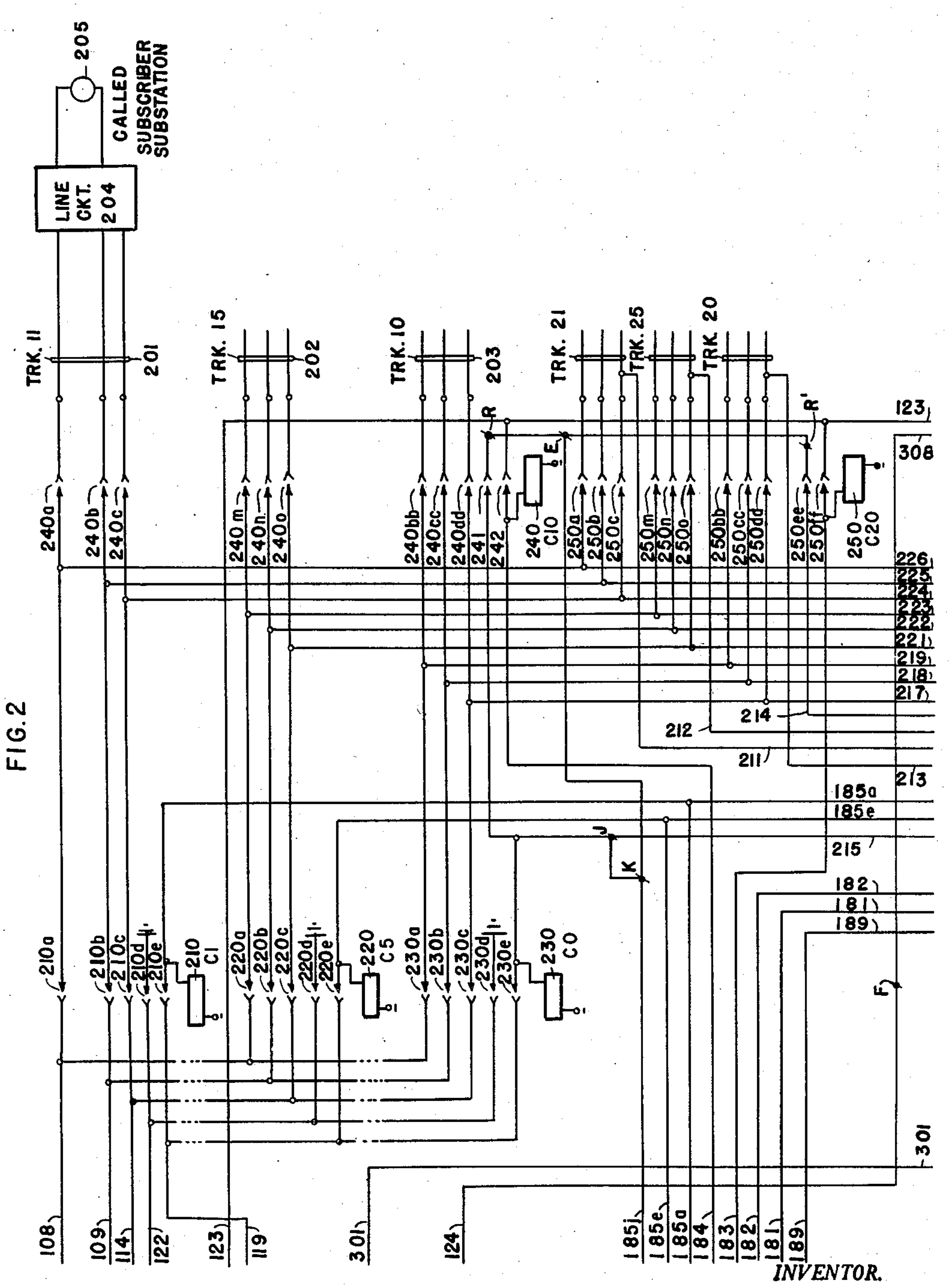
Figure 3:
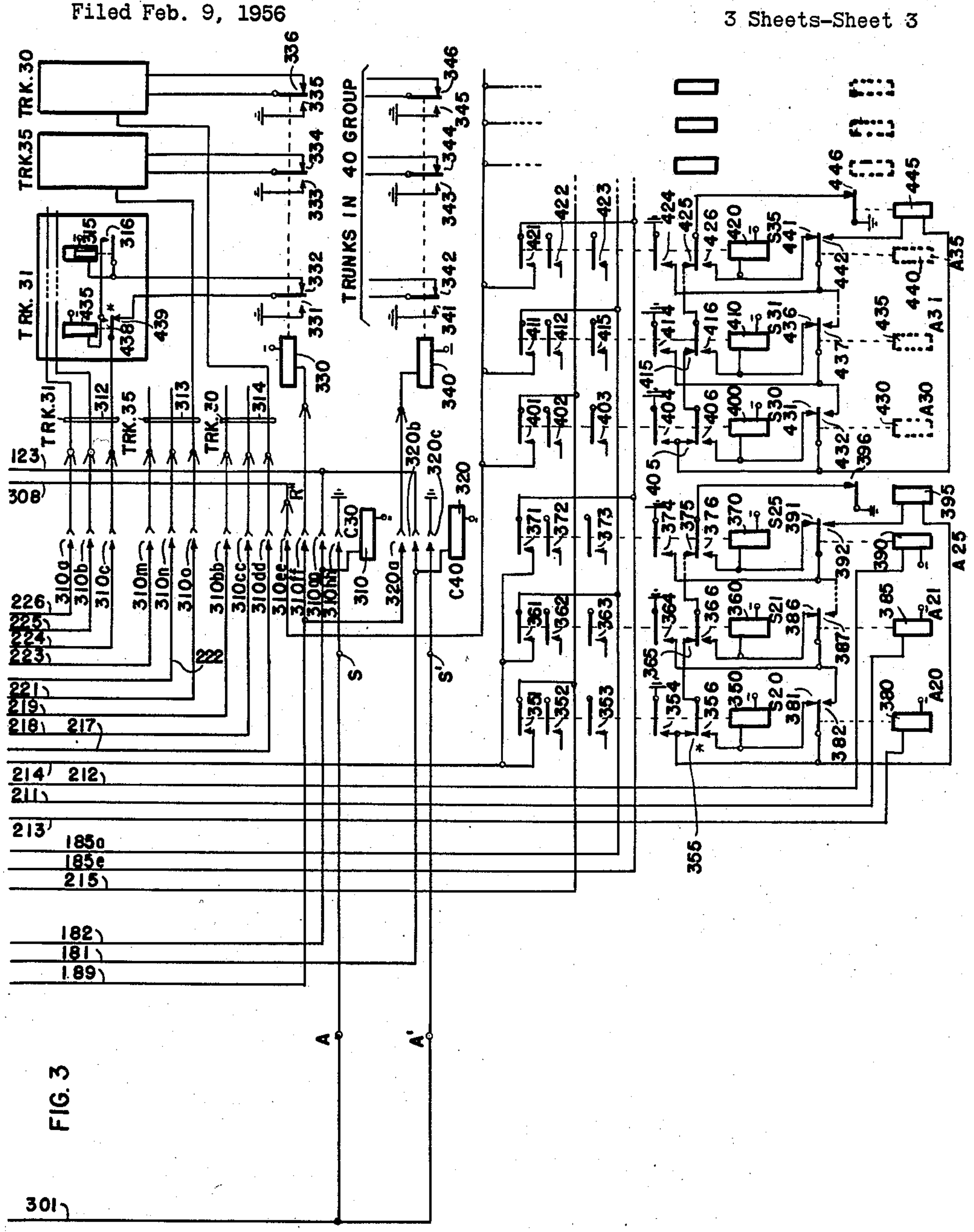

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figures 1, 2, and 3 are partial schematic diagrams illustrating the structure of the invention, and the interconnection of the invention with conventional telephone equipment.

The operation of the invention is best illustrated by showing first the establishment of a regular call by dialing a line number, next the establishment of a private branch exchange (P. B. X) call by dialing the line number of one digit of the group, and lastly showing the manner in which single digit trunks are guarded against seizure by dialing the line numbers of the trunk.

REGULAR SUBSCRIBER-TO-SUBSCRIBER CALL

*Called number 2112*

To establish a connection, the calling subscriber lifts the receiver from his substation, landing into an idle connector through line and line finder circuits in a conventional manner. Connector line relays 105 and 110 operate in series with the dial contacts over the line loop which extends back to the calling subscriber in the conventional manner.

Line relays 105 and 110 operate in series and relay 110 at its contacts 111 completes an energizing circuit for link hold relay 115, the circuit extending from minus battery over the winding of relay 115, and contacts 111 to ground. Slave relay 115 operates, and at its contacts 116 extends holding ground to the incoming P-wire 106;

and at its contacts 117 prepares a circuit to counting chain 180 and link transfer relay 120 which are rendered effective as the impulses as transmitted by the calling subscriber are received by the connector switch.

The calling subscriber dials the digits of the called line number which may, for purposes of illustration comprise a prefix, tens, units, and ring digits. Because the ringing circuits are conventional and form no part of the invention they have been omitted from the specification and from the drawings; their operation and interconnection will be well known and understood to those skilled in the art. Counting chains are likewise known in the art and a detailed explanation thereof is not required. Counting chain 180 comprises a relay chain which is controlled to advance in the conventional manner with the receipt of each impulse transmitted by the calling subscriber, and it is controlled by the link transfer relay 120 following receipt of the impulses which represent a digit to indicate over conductor sets, such as indicated at 181–189, the value of the digit registered thereon. Thus, if the tens digit is 1 or 2 a signal will be transmitted over conductor 184 or 183 respectively. In a similar manner a signal will be transmitted over one of the units conductors **185*a*–185*j* which corresponds to the value of the incoming units digit received. As shown in the drawing an operating signal is provided for the prefix relay whenever calls are to a local subscriber (in the present example indicated as those subscribers in the group having the prefix digit 2, it being obvious that calling subscriber groups having other prefix digits can be connected for similar operation). As further noted the counting chain is effective responsive to the receipt of digit 8 to connect a signal to conductor 182 (which controls operation of the third tens group relay C30 and is operative responsive to the dialing of digit 9 to connect an operating signal to conductor 181** which controls operation of the fourth tens relay).

As the calling subscriber transmits the impulses representative of the first digit the line relays 105, 110 operate in a responsive manner, the relays restoring with receipt of the break period of each pulse and operating with receipt of a make period following each break period.

With the first release of connector relay 110, link transfer relay 120 is energized over a circuit extending from minus battery over the winding of relay 120, contacts 117, 112, to ground. Link transfer relay 120 remains energized during the pulsing of each digit, and releases according to its slow-to-release characteristic at the end of each digit. The restoration of link transfer relay 120 after each digit has been dialed extends ground through contacts 121 and the operated ones of the counting chain relay contacts for selection.

The pulsing of connector relay 110 advances the counting chain 180 by applying ground over contacts 112 and 117, to the advance circuit for the counting chain. (Battery is provided for the counting chain over contacts 136 of control relay 135.) When selection has taken place after each digit (except the ring digit) is dialed, control relay 135 is operated and at its contacts 136 removes battery from the counting chain 180 to release same.

For exemplary purposes it is assumed that the called number is 2112, the assigned prefix digit for local subscribers in the present example being "2." Connector line relays 105 and 110 pulse twice in response to the calling partly dialing digit 2; link transfer relay 120 is operated as heretofore described responsive with receipt of the digit-representing impulse and the counting chain 180 runs up to the second position. As link transfer relay 120 releases following receipt of the digit, the counting chain effects the energization of prefix relay 170 which operates and at its contacts 171 prepares a series operating circuit with sequence relay 175, such circuit being temporily ineffective by reason of the shunt imposed thereon by the original energizing circuit for prefix relay 170; and at its contacts 172 prepares an intercepting circuit for improper trunk calls; at its contacts 174 completes an energizing circuit for the counting chain release relay 135.

Counting chain release relay 135 operates and at its contacts 136 interrupts the holding circuit to effect the release of the counting chain 180 to thereby remove the count which exists thereon.

As the counting chain restores the original operating circuit for the prefix relay 170 is interrupted, whereby the series holding circuit for relay 170 and sequence relay 175 is rendered effective. Sequence relay 175 operates and at its contacts 176 interrupts the operating circuit for the release relay 135 to effect the restoration thereof, which relay at its contacts 136 prepares the counting chain 180 for use responsive to receipt of a succeeding digit. As the calling subscriber dials the tens digit 1, connector relay 110 pulses once, operating link transfer relay 120 and driving counting chain 180 to the first position. Upon the release of link transfer relay 120 following receipt of the incoming digit it operates and locks over a circuit extending from battery over the winding of relay 240, contacts 242, conductor 123, the winding of relay 155 to ground, which relay is prevented from operating by reason of the shunt created on such circuit by the original energizing circuit for the group relay C10, and ground is extended from contacts 121 over contacts of the first counting chain relay, over conductor 184 to the connector tens relay 240 (C10—Figure 2), associated with the first ten line group (11—10). The connector tens relay 240 operates and at its contacts **240*a*–240*dd*, 241 and 242 prepares to extend the connection to one of the lines of the first ten group of lines 11—10; at its contacts 241 prepares an operating circuit for the tenth units relay 230 (C0—such circuit only being effective in the event that the call is being directed in the direction of the trunk line or P. B. X line), and at its contacts 242 prepares a holding circuit in series with the tens sequence relay 155 which circuit is ineffective pending interruption of the original energizing circuit in the tenth group relay 240 (C10**).

As the counting chain restores the original energizing circuit for relay C10 is interrupted and tens sequence relay 155 operates in series with the group relay 240 (C10), the circuit extending from battery over the winding of relay 240, contacts 242, conductor 123, winding of relay 155 to ground. Relay 155 operates and at its contacts 156 interrupts a point in a holding circuit for counting chain release relay 135 which is presently ineffective. The connector switch is now prepared for receipt of the units digit.

As the calling party dials the units digit, 1, connector relay 110 pulses once, link transfer relay 120 again operates, and counting chain 180 is driven to the first position. Upon the release of link transfer relay 120, an operating circuit is completed for the first connector units relay 210 which operates to select the first line of the selected tens group, the operating circuit for the first units relay 210 (C1) extending from battery over the winding of relay 210, conductor **185*a*, over the contacts of the first counting chain relay (not shown) of counting chain 180 and contacts 121 to ground. The first units relay 210 operates and at its contacts 210*d* completes an operating circuit for the units release relay 145 and at its contacts 210*e* prepares an operating circuit for units sequence relay 160 which is presently ineffective by reason of the shunt imposed thereon by the original energizing circuit for relay 210**.

Units release relay 145 operates and at its contacts 146 completes an operating circuit for release relay 135, the circuit extending from ground over contacts 146, the winding of relay 135, to negative battery. Relay 135 operates, and at its contacts 136 removes negative battery from the counting chain 180 to effect the restoration of the counting chain 180 and interruption of the original energizing circuit for the operated one of the units relays (the first unit relay 210 in the present example), to thereby remove the shunt for the series circuit energization for units sequence relay 160 and connector units relay 210 and thereby effect the operation of same. Units sequence relay 160 operates, and at its contacts 162 interrupts the energizing circuit for units release relay 145, which restores and at its contacts 146 effects restoration of counting chain release relay 135 whereby contacts 136 are closed to reapply battery to the counting chain 180 and thereby prepare same for operation responsive to receipt of the impulse representative of the succeeding digit.

A busy test is made in the interval between the energization of connector units relay 210 as selected by the counting chain and prior to the energization of relay 160 responsive to release of the counting chain, that is, as the operated units relay (the first units relay 210 in the present example), is effective at its contacts such as **210*a* and 210*c* to effect extension of conductors 108, 109 and 114 over the contacts of the operated one of the tens relays (contacts 240*a*–240*c* in the present example) to the line circuit 204 of the called subscriber substation. If the called line is busy the P-wire (test wire) of the called line will be connected to ground and an operating circuit will be completed for the busy test relay 140, the circuit extending from ground in the line circuit 204 over contacts 240*c*, conductor 114, contacts 210*c*, contacts 164, over contacts not shown, to the winding of relay 140 and battery. Relay 140 operates and at its contacts 142 opens the energizing circuit of switch-through relay 150, and at its contacts 141 and contacts 152*a* places busy tone (represented schematically by BT) on the negative conductor 104 extending from line and line finder circuits 102** to thereby terminate extension of the call.

In the event that the called line is not busy (i. e. the P-wire is not then connected to ground), relay 140 is not energized. As relay 160 operates, in such event it is effective at its contacts 164 to interrupt the energizing circuit for the busy relay 140 and at its contacts 161 to complete an operating circuit for switch-through relay 150, the circuit extending from negative battery, over the winding of relay 150, contacts 142, 161, conductor 122, contacts **210*d*, to ground. Relay 150 operates and at its contacts 152*b* and 153 connects the link to the called line and at its contacts 151 effects a connection from ground over 150 ohm resistor 113, contacts 151, 165, and conductor 114** to the called P-wire.

The calling subscriber next dials ring digit 2, for example, which pulses connector relay 110 and on the first pulse energizes link transfer relay 120. Upon release of link transfer relay 120 following receipt of the digit-representing impulse the conventional ringing circuits (not shown) are seized to ring the called line with, for example, frequency 2. The counting chain 180 is controlled to release and to restore through control of the counting chain release relay 135 by the ringing circuits in the manner heretofore set forth relative to the description of the counting chain control as the tens and units digits are received.

When the handset is removed at the called subscriber's substation in response to the ringing, answer relays 125 and 130 are energized in series over the called loop, tripping the ring over circuits not shown in the drawings. Answer relay 125 operates and at its contacts 126 removes ground from the calling P-wire 106; and effects insertion of a 150 ohm resistance 107 in the calling P-wire conductor 106 for supervisory purposes.

The calling line has control of the connection thus established. When the handset at the called subscriber substation 205 is replaced, relays 125 and 130 restore. When the handset at the calling subscriber's substation 101 is replaced the line loop is opened, connector relays 105 and 110 restore and relay 115 is in turn restored.

Relay 115 restores and at its contacts 118 removes link ground, thus releasing the remaining relays.

It is noted that the holding circuit of connector units relay 210 is connected directly over conductor **185*a* to the counting chain; likewise, the circuits for the other digits up to numeral 10 also are connected directly to the counting chain (e. g., relay 220 for digit 5 is connected over conductor 185*e* directly to counting chain 180). The circuit for the tenth units relay 230 (C0), however, is not connected directly to counting chain 180. The tenth relay 230** instead may be operated over one of three different paths which are used in accordance with the nature of the call:

(1) Briefly, in the event that a call is made to a regular subscriber line having the designation 10 the circuit will extend from negative battery over the winding of relay 230, contacts 241, terminal R to terminal E (when such connection is present), conductor **185*j*, and through the appropriate relay of counting chain 180** to ground;

(2) In the event that the call is being extended to a P. B. X group wherein one of the lines is the tenth line of a group, a circuit will extend from negative battery over the winding of relay 230, conductor 215, contacts 351 (Figure 3) of the operated one of the trunk indicator relays 350–370, conductor 214, contacts **250*ee*, terminal R' to terminal E (when such connection is present), conductor 185*j* and through the appropriate relay of counting chain 180** to ground;

(3) In the event that the call is being extended to trunk responsive to receipt of a single digit, the circuit will extend from negative battery over the winding of relay 230, conductor 215, contacts 401 (Figure 3) of the operated indicator relay S30–S35, contacts **310*ee*, terminal R'', conductor 308 (when such connection is present), terminal F (Figure 2), conductor 124, contacts 163 (Figure 1), and through contacts 173** to ground.

It is apparent from the foregoing description that the circuits for operating the tenth units relay are varied in accordance with the nature of the call.

SUBSCRIBER TO P. B. X CALL

*Called number 2201*

The manner in which a regular subscriber to subscriber call is established was set forth in the foregoing description. There is now considered the manner in which a subscriber effects extension of a connection to a P. B. X line. The P. B. X lines 220, 221—225 (of which only relays 221 and 225 are shown) can be reached over the trunk selection circuit, comprising relays 350, 360—370 (of which only relays 360 and 370 are shown).

P. B. X lines in a group may be assigned for rotation as follows:

Line 1—units digit 0
Line 2—units digit 1
Line 3—units digit 2
Line 4—units digit 3
Line 5—units digit 4
Line 6—units digit 5

The group of P. B. X lines is seized for rotation by dialing the regular subscriber prefix, the tens digit of the ten-line group of lines containing the P. B. X lines (which ten-line group may also contain other lines), the units digit 0 and the ring digit 1.

It will be apparent from the foregoing description that following the dialing of the digits 220 of the called number 2201, the prefix relay 170, the second tens relay 250 (C20) and the tenth units relay 230 (C0) will be operated. As noted above, the operating circuit for the tenth units relay 230 in the event of a P. B. X call extends from ground over contacts 121, through counting chain 180, conductor **185*j*, terminal E to terminal R', contacts 250*ee*, conductor 214, contacts 351 (if the first P. B. X line having units digit 0 is idle with indicator relay 350 operated as will be explained more fully hereinafter), conductor 215, the winding of units relay 230**, to negative battery.

The connector relay 230 (C0) operates and at its contacts **230*d* completes an energizing circuit for relay 145, the circuit extending from ground over contacts 230*d*, conductor 122, contacts 162, the winding of relay 145, to negative battery. Relay 145 operates and at its contacts 146 completes an energizing circuit for release relay 135, the circuit extending from ground over contacts 146, the winding of relay 135, to negative battery. Release relay 135 operates and at its contacts 136 removes negative battery from counting chain 180, and enables the series energization of relays 160 and 230. Relays 160 and 230 are operated in series, the energizing circuit extending from ground over the winding of relay 160, conductor 119, contacts 230*e*, the winding of relay 230, to negative battery. Relay 160 operates and at its contacts 161 completes an energizing circuit for switchthrough relay 150, the circuit extending from ground over contacts 230*d*, conductor 122, contacts 161, 142, the winding of relay 150, to negative battery. Switchthrough relay 150 operates and at its contacts 152*b* and 153 switches the link to line 220, and at its contacts 151 places a 150 ohm ground on the P-wire of line 220, completing an energization circuit for allotter relay 380 extending from ground over 150 ohm resistor 113, contacts 151, 165, conductor 114, contacts 230*c*, 250*dd*, conductor 213, the winding of relay 380** (Figure 3), to negative battery.

Allotter relay 380 operates and at its contacts 381 releases relay 350, and at its contacts 382 completes an energizing circuit for relay 360. Indicating relay 360 operates, the energizing circuit extending from ground over contacts 396, 375, 365, 355, 382, 386, the winding of relay 360, to negative battery. Thus, the trunk selector circuit is prepared to seize the trunk associated with operated relay 360 as the next incoming call to the P. B. X group is received. As the ring digit 1 is now dialed the seized one of the P. B. X trunk lines is rung.

The manner in which the P. B. X trunk selection circuits are operative is now briefly set forth hereat.

P. B. X TRUNK SELECTION

The trunk selection circuit, comprised of relays 350, 360—370 (of which only relays 360 and 370 are illustrated) which are associated with P. B. X lines 220, 221—225, operates as follows. If all trunks are idle, allotter relay 350 operates, such relay being energized initially over a circuit extending from ground through contacts 396, 375, 365, 355, 381, the winding of relay 350, to negative battery. Relay 350 is held over two separate circuits, the first holding circuit extending from negative battery over the winding of relay 350, make-before-break contacts 356, 365, 375, and 396 to ground, and the second holding circuit extending from negative battery over the winding of relay 350, contacts 381, 354, to ground.

Upon the energization of allotter relay 380 responsive to selection of the first P. B. X trunk the second holding circuit for relay 350 is broken at contacts 381 and an energization circuit is completed for relay 360 from negative battery over the winding of relay 360, contacts 386, 382, 354, to ground. The second indicator relay 360 operates and at its contacts 365 opens the first holding circuit of relay 350, restoring relay 350. Indicator relay 360 is held over two holding circuits similar to those previously established for relay 350 upon energization. Indicator relay 360 operates and at its contacts 361, 362 . . . 363 prepares circuits for extending ground over conductors **185*j* and 214 from the counting chains of the various links to operate units relays (e. g., 210) of the various links; relays 350—370 operate in like manner. Thus if the first P. B. X call to group 220 comes through connector 1, units relay 230 in connector 1 is operated over contacts 351 of relay 350. If the next P. B. X call to group 220 comes through connector 2, units relay 210 in connector 2 is operated over contacts 362 of relay 360**, etc.

It is apparent that whenever a connector is used in the establishment of a call to a P. B. X line it effects the imposition of ground on a P-wire of the particular line of the group which has been seized, and thereby effects operation of the next relay in the allotter circuit.

The sixth call to a P. B. X group operates units relay 220 in the calling connector and relay 390, but relay 370 remains locked over a circuit extending from negative battery over the winding of relay 370, contacts 376, 396 to ground.

If a seventh call to the P. B. X group is attempted when all P. B. X lines are busy, ground is extended through counting chain 180 over conductor **185*j*, terminal E to terminal R', contacts 250*ee*, conductor 214, contacts 371, conductor 185*e*, the winding of relay 220, to negative battery. Relay 220 operates in this manner. However, the P-wire of line 225 is grounded from another connector, and during the busy test relay 140** operates, returning busy tone to the line of the calling party.

When any P. B. X line is released, the removal of ground from the P-wire of such line releases one of associated relays 380—390. If the last P. B. X line 225 is released, the removal of ground from its P-wire allows it to be seized by the next call. If any P. B. X line other than the last is released, a circuit is completed to operate relay 395 in series with the associated trunk selection relay 350—370. Assuming, for example, that line 221 is released, relay 385 restores, allowing relay 395 to operate in series with relay 360, the operating circuit extending from negative battery over the winding of relay 360, contacts 386, 382, the winding of relay 395, contacts 392, 374, to ground. Relay 395 operates, releasing relay 370, and relay 360 is held over two holding circuits. If two P. B. X lines are released at the same time, the lower one of relays 380—390 takes precedence. Thus, calls attempted by dialing 2201 are rotated over the various P. B. X lines through the same or various connectors.

It is noted that if 225 is dialed, units relay 220 can be operated from ground on lead **185*e* from counting chain 180**, as a result of units digit 5 being dialed, without going through the trunk selection circuit.

SUBSCRIBER TO SINGLE DIGIT TRUNK CALL

*Single digit code 8*

As has been previously noted the connector switch is connected to effect the seizure of a group of outgoing trunks responsive to selection of the third tens relay 310 (C30), which in turn is connected for seizure by the counting chain responsive to the dialing of the digit 8. The manner in which such trunk selection is effected is now described.

Briefly, a calling subscriber dials the digit 8 to reach a single digit trunk, connector relay 110 pulses, in turn operating link transfer relay 120 and advancing counting chain 180 to the eighth position. As link transfer relay 120 restores following receipt of the impulses ground is connected through contacts of the eighth counting chain relay to conductor 182, completing an operating circuit for relay 310. Relay 310 operates, the energizing circuit extending from negative battery over the winding of relay 310, conductor 182, through the appropriate relay of counting chain 180, contacts 121, to ground. Relay 310 operates and at its contacts **310*hh* connects ground to terminal S, which is connected through terminal A, to conductor 301, contacts 156, the winding of relay 135, to negative battery. Relay 135 operates, releasing the counting chain, and interrupts the original energizing circuit for relay 310 to enable the circuit for relay 155 in series with relay 310. Relay 155 operates and at its contacts 156 restores relay 135**.

Since the digit "2" has not been dialed the prefix relay 170 has not been operated, and an energizing circuit is completed for the tenth units relay 230 (C0), which circuit extends from ground over contacts 173, 163, conductor 124, terminal F, conductor 308, terminal R'', contacts **310*ee*, contacts 401 (assuming that the automatic trunk rotation circuit has operated relay 400 to prepare for connection to the trunk on line 314), conductor 215, the winding of relay 230, to negative battery. The tenth units relay 230 operates, and in turn operates relay 145 which completes an energizing circuit for relay 135, releases the counting chain 180, and enables relay 160 to operate in series with relay 230**.

It is noted that the units relay 230 and tens relay 310 both close circuits to release relay 135, but that release relay 135 is not restored until both the units and tens sequence relays 155 and 160 are energized. The busy test takes place as usual between the operation of the units relay 230 and the operation of relay 160. If the called trunk is idle, relay 150 operates, extending the transmission wires to the trunk and placing 150 ohm ground on the P-wire of line 314.

If trunk 314 had been busy, the trunk selection circuit would have operated relay 410, and units relay 210 would now be operated instead of units relay 230 whereby idle line 31 instead of busy line 30 is selected. The connections and manner of operation of the trunk selection circuit for the single digit trunks is obvious from the description set forth in the matter of the operation of the P. B. X trunk selector circuits S20–25 and A20–A25. As a result the corresponding allotter relays 430–440 and indicator relays 400–420 are shown schematically rather than in detail. Further, as a matter of convenience, the allotter relay 435 has been shown in its connections in trunk 31 and is represented again by dotted symbols in the trunk selection circuit below.

Relay 150 operates and at its contacts 151 places 150 ohm ground on the P-wire of line 312, to operate trunk relay 315, the circuit extending from negative battery over the winding of relay 315, contacts 332, 439, **310*c*, conductor 224, contacts 210*c*, conductor 114, contacts 165, 151, and 150 ohm resistor 113 to ground. Trunk relay 315 operates and at its contacts 316 extends this 150 ohm ground to trunk relay 435 which itself locks, together with relay 315, to the P-wire ground over make-before-break contacts 437**.

It should be observed that the ground connection supplied for operating connector units relays 210–230 passes through break contacts 173 of the prefix relay 170. Thus, should the calling subscriber attempt to engage trunk 314 (the "30" trunk) by dialing 230, the prefix relay "2" operates and the circuit to units relay 230 is opened at contacts 173 of prefix relay 170. Accordingly, a connection cannot be established to trunk 314. However, if the calling subscriber should dial 231, 232, 234 or 235, a connection to these trunks can be established by operation of the associated units relays directly from the counting chain, and accordingly means are provided to prevent establishment of such connection.

In accordance with the invention, means are provided including trunk blocking relay 330 for trunk 314, which represents trunk group 30 (and trunk blocking relay 340 for trunk group 40, reached by dialing digit 9), for preventing connection to such trunks by operating associated units relays directly from counting chain 180.

For example, if the calling subscribed dials 231 in an attempt to establish a connection with trunk line 312 (trunk 31), tens relay 310, etc., the prefix relay 170, units relay 210, and release control relay 145 would be operated. As a result trunk blocking relay 330 is operated over a circuit extending from ground over contacts 147, 172, conductor 189, contacts **310*ff*, the winding of relay 330, to negative battery. Relay 330 operates and at its contacts 331 completes the circuit for operating the busy test relay 140, the circuit extending from ground over contacts 331, 439, 310*c*, conductor 224, contacts 210*c*, conductor 114, contacts 164, the winding of relay 140 to negative battery. Relay 140 operates during the busy test, before relay 135 operates; the counting chain releases and relay 160 is operated in series with relay 210. Thus, busy tone is returned to the line of the calling subscriber. Trunk blocking relay 330** similarly grounds the P-wires of all other trunks in the group.

Had 241 been dialed by a calling subscriber in an attempt to establish a connection to trunk 41, relay 340 would have been operated in a similar manner, grounding the P-wire of trunk 41. In like manner, a plurality of trunk blocking relays may be utilized for trunks 42–45.

Upon a cursory perusal of telephone exchange equipment, it may appear that a different method usable to guard against single digit trunk seizure might be to connect the circuits of the connector units pulling leads associated with the trunks through break contacts of prefix relay 170; however, this is not feasible because the same units relays may be used for subscribers lines in other tens groups.

It should be understood that tens groups containing P. B. X lines or single digit trunks may also contain subscriber lines and that in calls to subscribers in tens groups containing single digit trunks, the associated trunk blocking relay (such as relays 330 or 340) will be operated, momentarily grounding the P-wires associated with the trunks in the group, which grounding does not interfere with selection of the other lines in the group or unduly interfere with trunk selection by other connectors.

The invention discloses a new and useful means of preventing the seizure of single digit trunks when the line numbers of these trunks are dialed. Such seizure is prevented with a minimum addition of equipment, the equipment needed principally being the trunk blocking relays such as 330 and 340 illustrated in Figure 3 of the drawings. The manner of interconnection and operation with standard telephone exchange equipment is clearly illustrated both in the specification and in the drawings. The obvious flexibility of such a method of operation is apparent upon reading the specification, and it must be remembered that the P-wire multiples in the connector links need not be altered when employing this new and useful method for preventing seizure of single digit trunks.

While a particular embodiment of the invention has been shown and described, it is apparent that modifications and alterations may be made, and it is intended in the appended claims to cover all such modifications and alterations as may fall within the true spirit and scope of the invention.

What is claimed is:

1. An automatic telephone system including a plurality of connector switches for extending connections from an incoming line to associated lines, said lines being divided into groups and subgroups, certain of said lines being connected as subscriber lines and others of said lines being connected as trunk lines, selection means associated with at least one of said connector switches including means operative responsive to receipt of impulses indicative of a group and subgroup designating a line connected as a subscriber line to select the line indicated by said impulses, and means including said selection means operative responsive to receipt of impulses indicative of a group and subgroup designating a line connected as a trunk line to connect a busy indication to said trunk line to busy said trunk line to said connector switch.

2. An automatic telephone system including a plurality of connector switches for extending connections from an incoming line to associated lines, said lines being divided into groups and subgroups, certain of said lines being connected as subscriber lines and others of said lines being connected as trunk lines, selection means including a prefix relay associated with at least one of said connector switches for indicating a line and means operative responsive to receipt of impulses indicative of a group and subgroup designating a line connected as a subscriber line to select the indicated line, means controlled by said selection means and said prefix relay operative responsive to receipt of impulses indicative of a group and subgroup designating a line connected as a trunk line to connect a busy indication to said trunk line to busy said trunk line to said connector switch, and means including said selection means for effecting selection of said trunk line only responsive to receipt of a single predetermined digit.

3. An automatic telephone system including a plurality of connector switches for extending connections from an incoming line to a group of associated lines, each of said lines having a tens and units number consistent with its position in the group, certain of said lines being connected as subscriber lines and others of said lines being connected as trunk lines and having a single digit code assigned thereto, selection means associated with at least one of said connector switches including a prefix relay and tens and units relays, incoming means connected to operate said relays responsive to receipt of impulses indicative of a tens and units number designating a line connected as a subscriber line to select said line, means including said incoming means and said selection means operative responsive to receipt of said single digit code to operate the one of the tens relays which has access to the desired trunk line, a trunk selection circuit for controlling operation of one of the units relays responsive to operation of said one tens relay to extend the incoming line to the desired trunk line, means controlled by said prefix relay and said selection means responsive to receipt of impulses indicative of a tens and units number designating a line connected as a trunk line to connect a busy indication to said trunk line to busy said trunk line to said connector switch, busy test means in said connector switch for testing the condition of said trunk line prior to selection of the indicated line, and means operative responsive to detection of said busy indication to couple a busy signal to said incoming line.

4. An automatic telephone system including a plurality of connector switches for extending connections from an incoming line to a group of associated lines, each of said lines having a tens and units number consistent with its position in the group, certain of said lines being connected as subscriber lines and others of said lines being connected as trunk lines and having a single digit code assigned thereto, selection means associated with at least one of said connector switches including a prefix relay and tens and units relays, incoming means connected to operate said relays responsive to receipt of impulses indicative of a tens and units number designating a line connected as a subscriber line to select said line, means including said selection and incoming means operative responsive to receipt of said single digit code to operate the one of the tens relays which has access to the desired trunk line, a trunk selection circuit controlled by said prefix relay and said selection means for effecting operation of one of the units relays responsive to operation of said one tens relay, means operative responsive to operation of said units relay to extend the incoming line to the desired trunk line, a trunk blocking relay connected for access by a plurality of said connector switches and means including said prefix relay and said selection means operative responsive to receipt of impulses indicative of a tens and units number designating a line connected as a trunk line to seize said trunk blocking relay, and means controlled by said trunk blocking relay responsive to seizure thereof to busy said trunk line to said connector switch.

No references cited.